United States Patent
Conrad et al.

(10) Patent No.: US 11,046,321 B2
(45) Date of Patent: Jun. 29, 2021

(54) ADAPTIVE CONTROL OF AUTOMATED LANE CHANGE IN VEHICLE

(71) Applicant: GM Global Technology Operations LLC, Detroit, MI (US)

(72) Inventors: Kevin P. Conrad, South Lyon, MI (US); Daryl A. Wilson, Brighton, MI (US); Bryan M. Joyner, Clarkston, MI (US); Kenneth L. Rosol, Harper Woods, MI (US); Daniel B. Cutler, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 201 days.

(21) Appl. No.: 16/352,155

(22) Filed: Mar. 13, 2019

(65) Prior Publication Data

US 2020/0290618 A1 Sep. 17, 2020

(51) Int. Cl.
*B60W 30/18* (2012.01)
*B60W 30/09* (2012.01)
*B60W 30/16* (2020.01)
*G08G 1/16* (2006.01)

(52) U.S. Cl.
CPC .... *B60W 30/18163* (2013.01); *B60W 30/162* (2013.01); *G08G 1/167* (2013.01); *B60W 2554/801* (2020.02); *B60W 2554/804* (2020.02)

(58) Field of Classification Search
CPC ....... B60W 30/18; B60W 30/09; B62D 15/02; G08G 1/16
See application file for complete search history.

(56) References Cited

U.S. PATENT DOCUMENTS

| | | | |
|---|---|---|---|
| 2017/0174262 A1* | 6/2017 | Kobayashi | G01S 19/14 |
| 2017/0349173 A1* | 12/2017 | Nishiguchi | B62D 15/0255 |
| 2018/0178796 A1* | 6/2018 | Fukuda | B60W 30/16 |
| 2020/0066160 A1* | 2/2020 | Mishina | G08G 1/167 |

* cited by examiner

*Primary Examiner* — Yuri Kan
(74) *Attorney, Agent, or Firm* — Cantor Colburn LLP

(57) ABSTRACT

Systems and methods of performing adaptive control of an automated lane change in a vehicle include positioning a target vehicle with a target speed in a target lane at a target distance behind the vehicle. The target speed is greater than a speed of the vehicle, and the vehicle will move into the target lane based on the automated lane change. The method includes determining a deceleration needed by the target vehicle over a braking distance, which is less than the target distance, to match the speed of the vehicle, and determining whether the deceleration exceeds a threshold deceleration. The automated lane change is prohibited based on the deceleration exceeding the threshold deceleration.

20 Claims, 4 Drawing Sheets

ADAPTIVE CONTROL OF AUTOMATED LANE CHANGE IN VEHICLE

The subject disclosure relates to adaptive control of an automated lane change in a vehicle.

Vehicles (e.g., automobiles, trucks, construction equipment, farm equipment, automated factory equipment) are increasingly equipped with sensors that provide information about the vehicle and its surroundings. These sensors (e.g., cameras, radar systems, lidar systems) have enabled automation of aspects of vehicle operation or entirely autonomous vehicle operation. Lane change, during which a vehicle transitions between two lanes with traffic travelling in the same direction, is an aspect of vehicle operation that has been automated. Automated lane change may be part of autonomous driving or semi-autonomous driving (e.g., hands-free driving). Accordingly, it is desirable to provide adaptive control of an automated lane change in a vehicle.

SUMMARY

In one exemplary embodiment, a method of performing adaptive control of an automated lane change in a vehicle includes positioning a target vehicle with a target speed in a target lane at a target distance behind the vehicle. The target speed is greater than a speed of the vehicle, and the vehicle will move into the target lane based on the automated lane change. The method also includes determining a deceleration needed by the target vehicle over a braking distance, which is less than the target distance, to match the speed of the vehicle, and determining whether the deceleration exceeds a threshold deceleration. The automated lane change is prohibited based on the deceleration exceeding the threshold deceleration.

In addition to one or more of the features described herein, the method also includes determining the target distance as a maximum detection range of one or more sensors of the vehicle.

In addition to one or more of the features described herein, the method also includes determining the target distance as a distance less than a maximum detection range of one or more sensors of the vehicle based on detecting a following vehicle behind the vehicle.

In addition to one or more of the features described herein, the method also includes determining the target distance based on a location of the one or more sensors of the vehicle, a distance between the vehicle and the following vehicle, and a width of the following vehicle.

In addition to one or more of the features described herein, the method also includes determining the target speed as a fixed value above a posted speed limit for the target lane.

In addition to one or more of the features described herein, the method also includes determining a recognition distance as a distance traveled by the target vehicle in a fixed period of time.

In addition to one or more of the features described herein, the method also includes determining the braking distance as the recognition distance and a pre-defined buffer distance subtracted from the target distance.

In addition to one or more of the features described herein, the determining the deceleration needed by the target vehicle is based on the target speed T being an initial speed, the speed of the vehicle S being a final speed, and a distance for the deceleration being the braking distance D.

In addition to one or more of the features described herein, the determining the deceleration needed by the target vehicle includes computing:

$$\frac{S^2 - T^2}{2D}.$$

In addition to one or more of the features described herein, the method also includes allowing the automated lane change based on the deceleration being less than or equal to the threshold deceleration.

In another exemplary embodiment, a system to perform adaptive control of an automated lane change in a vehicle includes one or more sensors to detect objects behind the vehicle, and a processor to position a target vehicle with a target speed in a target lane at a target distance behind the vehicle. The target speed is greater than a speed of the vehicle, and the vehicle will move into the target lane based on the automated lane change. The processor additionally determines a deceleration needed by the target vehicle over a braking distance, which is less than the target distance, to match the speed of the vehicle, determines whether the deceleration exceeds a threshold deceleration, and prohibits the automated lane change based on the deceleration exceeding the threshold deceleration.

In addition to one or more of the features described herein, the processor determines the target distance as a maximum detection range of one or more sensors of the vehicle.

In addition to one or more of the features described herein, the processor determines the target distance as a distance less than a maximum detection range of one or more sensors of the vehicle based on detecting a following vehicle behind the vehicle.

In addition to one or more of the features described herein, the processor determines the target distance based on a location of the one or more sensors of the vehicle, a distance between the vehicle and the following vehicle, and a width of the following vehicle.

In addition to one or more of the features described herein, the processor determines the target speed as a fixed value above a posted speed limit for the target lane.

In addition to one or more of the features described herein, the processor determines a recognition distance as a distance traveled by the target vehicle in a fixed period of time.

In addition to one or more of the features described herein, the processor determines the braking distance as the recognition distance and a pre-defined buffer distance subtracted from the target distance.

In addition to one or more of the features described herein, the processor determines the deceleration needed by the target vehicle is based on the target speed T being an initial speed, the speed of the vehicle S being a final speed, and a distance for the deceleration being the braking distance D.

In addition to one or more of the features described herein, the processor determines the deceleration needed by the target vehicle based on computing:

$$\frac{S^2 - T^2}{2D}.$$

In addition to one or more of the features described herein, the processor allows the automated lane change based on the deceleration being less than or equal to the threshold deceleration.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
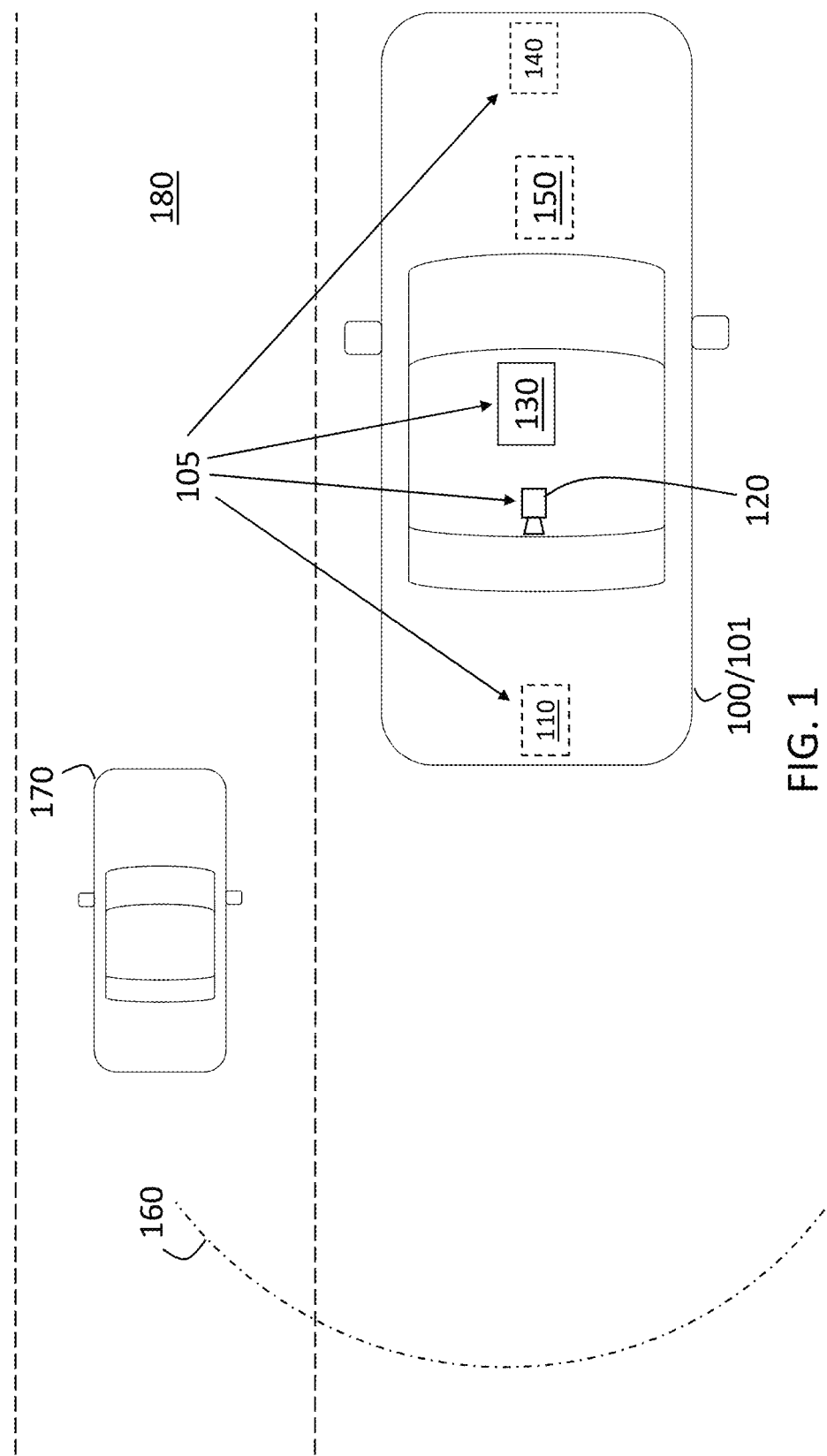
FIG. 1 is a block diagram of a vehicle that includes adaptive control of an automated lane change.

The following description is merely exemplary in nature and is not intended to limit the present disclosure, its application or uses. It should be understood that throughout the drawings, corresponding reference numerals indicate like or corresponding parts and features.

As previously noted, automated lane change operations may be part of autonomous or semi-autonomous operation of a vehicle. Typically, a lane change may be undertaken when the adjacent lane, into which the vehicle will move, is free of obstructions. That is, the position of other vehicles or any objects within the field of view of vehicle sensors (e.g., cameras) is determined. If no other vehicles or other objects are in the path of the lane change, it is undertaken. However, considering only the objects within the field of view to determine whether an automated lane change may be undertaken may be problematic under certain circumstances. For example, for an automated lane change from a first lane into a second lane, even if it is determined that there are no objects in the second lane according to the field of view of the sensors of the vehicle, a fast-moving vehicle may be just outside the field of view. This fast-moving vehicle may be forced to brake excessively (e.g., more than an established threshold amount) in order to avoid a collision based on the lane change. Embodiments of the systems and methods detailed herein relate to adaptive control of an automated lane change in a vehicle. The adaptive control may prevent an automated lane change that may otherwise be undertaken.

In accordance with an exemplary embodiment, FIG. 1 is a block diagram of a vehicle that includes adaptive control of an automated lane change. The exemplary vehicle is an automobile 101 and is referred to as the subject vehicle 100. The subject vehicle 100 includes several sensors 105. A radar system 110, a camera 120, and a lidar system 130 are shown as rear-facing sensors 105, which are of interest in the automated lane change scenario according to one or more embodiments. Another radar system 140 is shown as front-facing. According to alternate embodiments, additional sensors 105 may be included, and any of the sensors 105 may be located at different places in or on the subject vehicle 100.

A controller 150 is also shown in the subject vehicle 100. The controller 150 may obtain raw data or information from one or more sensors 105, individually or according to conventional sensor fusion schemes. The data or information is used to detect objects 170 in the field of view of the sensors 105. The exemplary object 170 shown in FIG. 1 is another vehicle. The maximum detection range 160 is also shown. This maximum detection range 160 may be based on one of the sensors 105 (e.g., radar system 110) or may result from fusion of two or more sensors 105 (e.g., radar system 110 and camera 120). The lane that the subject vehicle 100 would move into based on the automated lane change is referred to as a target lane 180 for explanatory purposes. The detection of objects 170 by one or more sensors 105 and the determination of maximum detection range 160 are not detailed here. Detection of object 170 by one or a combination of the sensors 105 is well-known, and the embodiments detailed herein relate to an undetected vehicle rather than a detected object 170. Further, determination of the maximum detection range 160 for any of the exemplary sensors 105 is known and is assumed to be a known parameter for the controller 150. The modification of the maximum detection range 160 based on a following vehicle 400 (FIG. 4) is discussed with reference to FIG. 4.

As detailed with reference to FIG. 3, the controller 150 assumes that another vehicle, referred to as a target vehicle 200 (FIG. 2) for explanatory purposes, is just beyond the maximum detection range 160 in the target lane 180. The controller 150 calculates the braking required by this target vehicle 200 to determine if the automated lane change should be prohibited. To perform the functionality discussed herein, the controller 150 may include processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

Figure 2:
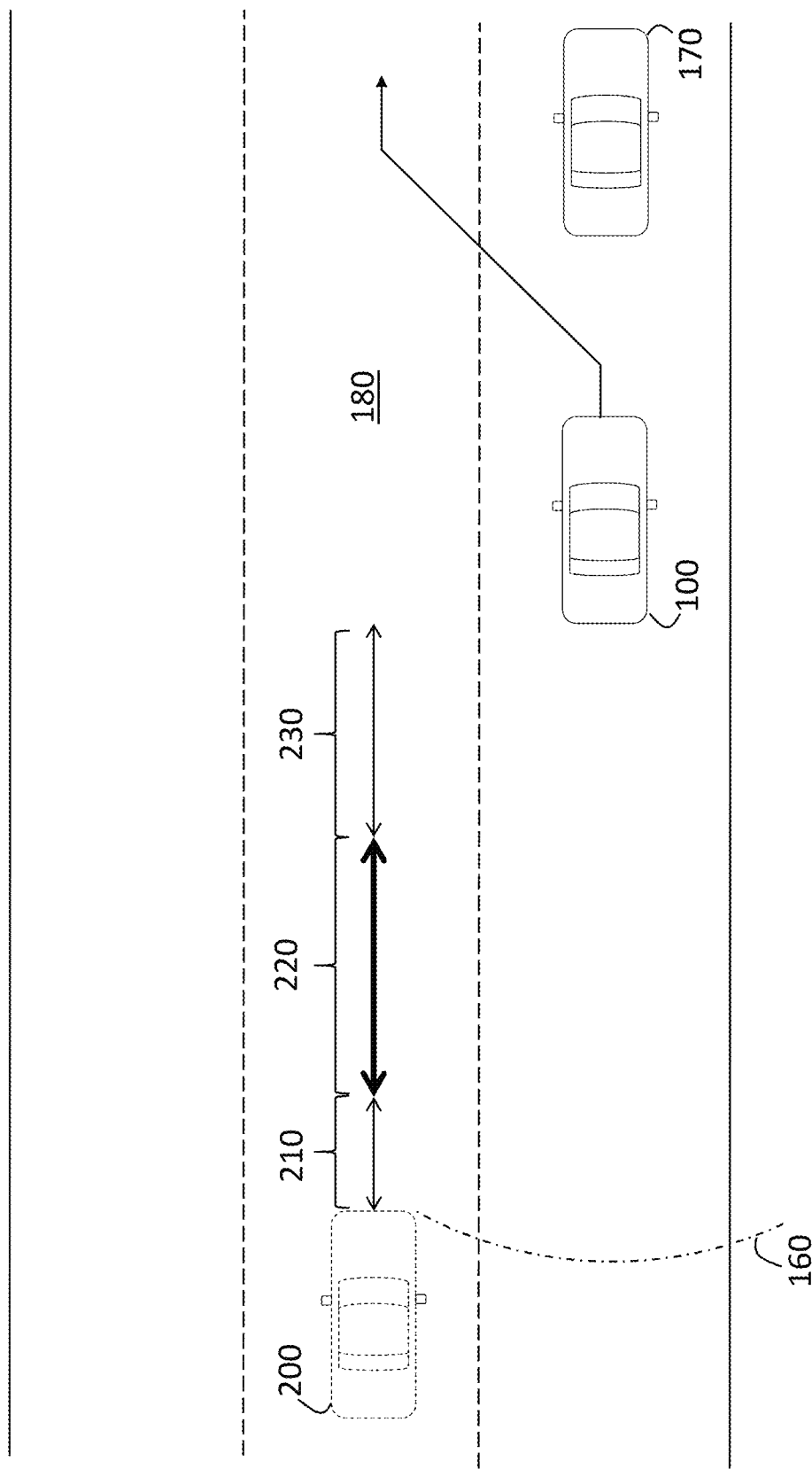
FIG. 2 is a block diagram that illustrates the process of performing adaptive control of an automated lane change according to one or more embodiments.

FIG. 2 is a block diagram that illustrates the process of performing adaptive control of an automated lane change according to one or more embodiments. The subject vehicle 100 is shown with a detected object 170 (another vehicle) in front of it. There are no detected objects 170 in the target lane 180. Beyond the maximum detection range 160 behind the subject vehicle 100, the controller 150 assumes the presence of a target vehicle 200. As previously noted, the target vehicle 200 is not a detected object 170 but is an assumed object for purposes of determining whether an automated lane change should proceed. The controller 150 assumes that the speed at which the target vehicle 200 is travelling is a value $\Delta$ above the speed limit (speed=speed limit+$\Delta$). The factors used to determine the value $\Delta$ are further discussed with reference to FIG. 3. Three zones 210, 220, 230 are indicated in FIG. 2.

The recognition zone 210 is a distance that the target vehicle 200 will travel in a defined length of time (e.g., 1 second). This defined length of time is referred to as the recognition time and is the duration assumed for the driver of the target vehicle 200 to recognize that the subject vehicle 100 is changing lanes. The buffer zone 230 is a specific distance from the rear of the subject vehicle 100. The buffer zone 230 distance is set based on the speed of the vehicle 100. For example, the buffer zone may be on the order of 2 meters for a relatively low speed and on the order of 20 meters for a relatively high speed of the vehicle 100. The initial setting or subsequent refinement of the buffer zone 230 distance may be based on experimentation or experience.

The braking zone 220 is the remaining distance. That is, the controller 150 knows the maximum detection range 160, as noted previously. Thus, the controller 150 can determine the braking zone 220 by subtracting the recognition zone 210, which is determined based on the assumed speed of the target vehicle 200, and the buffer zone 230 from the maximum detection range 160. This braking zone 220 is the distance within which the target vehicle 200 must reduce its speed to match the speed of the subject vehicle 100, which is known to the controller 150. The controller 150 determines if the deceleration that must occur within the braking zone 220 is greater than a threshold deceleration. That is, the controller 150 determines if the target vehicle 200 must brake too hard (according to the predetermined threshold) in order to match the speed of the subject vehicle 100 before it reaches the buffer zone 230. If so, then the controller 150 determines that the automated lane change should not be implemented.

Figure 3:
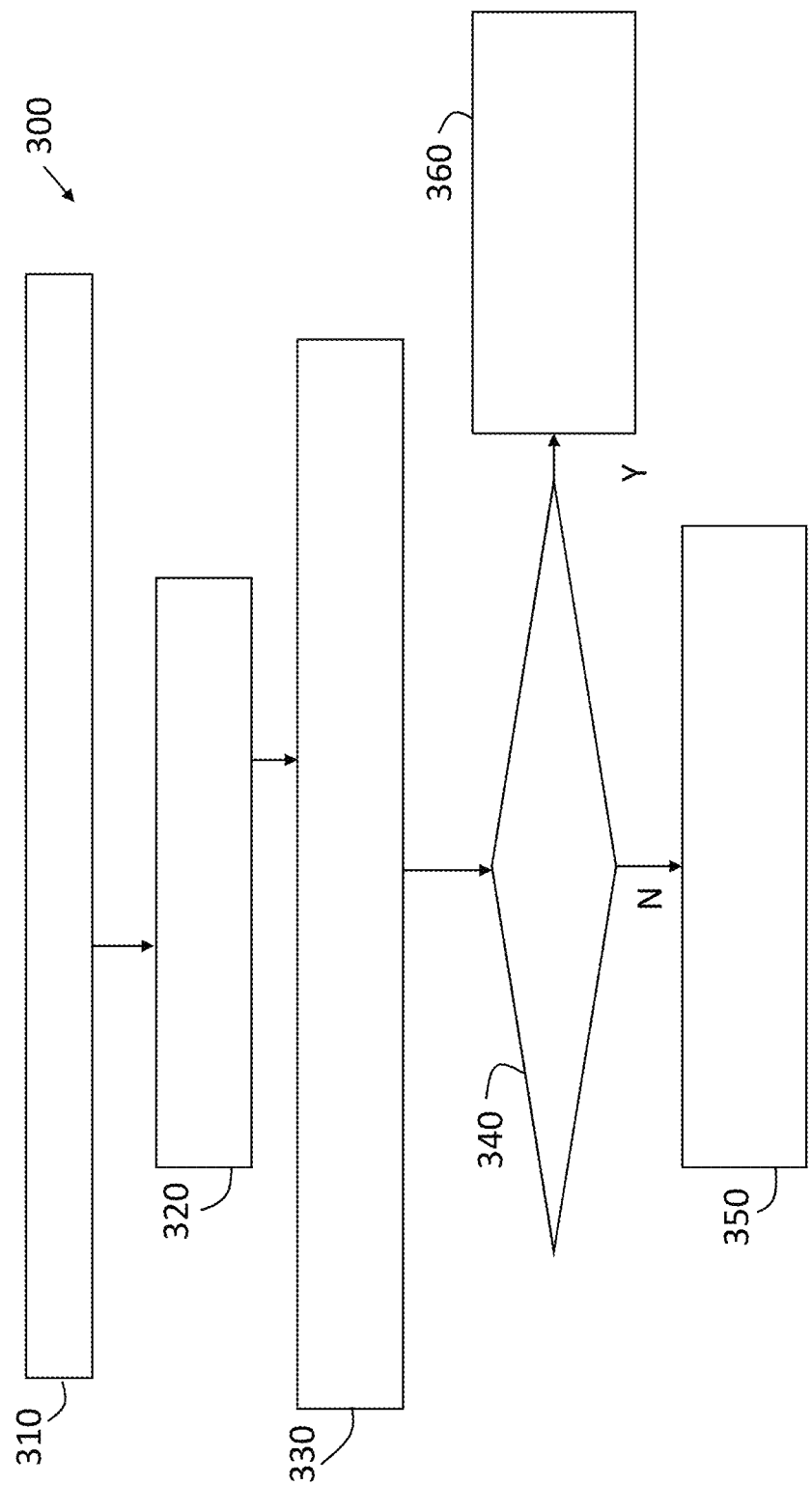
FIG. 3 is a process flow of a method of performing adaptive control of an automated lane change according to one or more embodiments.

FIG. 3 is a process flow 300 of a method of performing adaptive control of an automated lane change according to one or more embodiments. The processes detailed for the process flow 300 may be performed by the controller 150. The process flow 300 may be initiated when an automated lane change is suggested by an existing autonomous or semi-autonomous driving system. In alternate embodiments, the processes at blocks 310 and 320 may be performed regularly on a periodic basis or on an event-based basis (e.g., every time the speed of the subject vehicle 100 changes). At block 310, determining maximum detection range 160 is based on which sensors 105 are used (e.g., one or more radar systems 110) and the speed of the subject vehicle 100. As further discussed with reference to FIG. 4, the known value of maximum detection range 160 for a given sensor 105 may be modified when the field of view of the sensor 105 is affected (e.g., by following vehicle 400 in FIG. 4). When an automated lane change is under consideration (i.e., it has been suggested by an autonomous or semi-autonomous driving system), then the determination of maximum detection range 160 is also the determination of the distance to a target vehicle 200, which is an undetected vehicle that is assumed to be just outside the field of view of the sensors 105 being used.

At block 320, determining a speed for the target vehicle 200 may be based on the speed limit, as previously noted. For example, the speed of the target vehicle 200 may be assumed as (speed limit+Δ), and Δ may be selected as 15 miles per hour, for example. The value of Δ may be adjusted based on weather conditions or other factors, for example. At block 330, the process flow 300 includes computing the deceleration needed by the target vehicle 200 in the braking zone 220. As discussed above, the length of the braking zone 220 is determined by subtracting the lengths of the recognition zone 210 and the buffer zone 230 from the maximum detection range 160. The target vehicle must decelerate from the determined speed of the target vehicle 200 (from block 320) T to the speed of the subject vehicle 100 S over the length of the braking zone 220 D. Thus, the deceleration is given by:

$$\text{deceleration} = \frac{S^2 - T^2}{2D} \quad [\text{EQ. 1}]$$

At block 340, a check is done of whether the deceleration computed with EQ. 1 is greater than a threshold deceleration. The threshold deceleration may be selected as 0.2 g, for example (g=9.81 meters/seconds$^2$). If the deceleration required of the (hypothetical) target vehicle 200 in the braking zone 220 is less than or equal to the threshold value (according to the check at block 340), then the process flow 300 includes proceeding with the automated lane change, at block 350. If, instead, the deceleration determined at block 330 exceeds the threshold (at block 340), then the process flow 300 includes prohibiting the planned automated lane change, at block 360.

Figure 4:
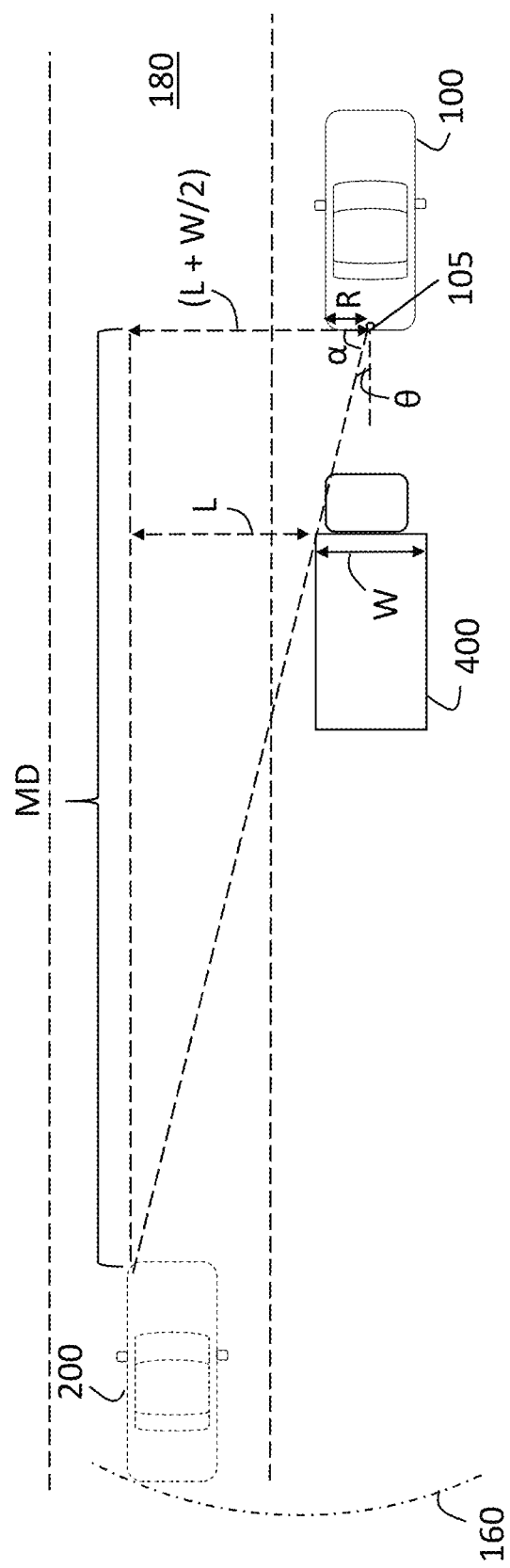
FIG. 4 illustrates an exemplary scenario in which adaptive control of an automated lane change is performed according to one or more embodiments.

FIG. 4 illustrates an exemplary scenario for which the maximum detection range 160 (at block 310, FIG. 3) is modified to perform adaptive control of an automated lane change according to one or more embodiments. FIG. 4 indicates the maximum detection range 160 according to the sensor 105 (at the center of the rear of the subject vehicle 100) being used for the purpose of automated lane change. If there were no following vehicle 400 within the maximum detection range 160 behind the subject vehicle 100, this maximum detection range 160 would be used at block 310, FIG. 3. However, when, as in the exemplary scenario shown in FIG. 4, there is a following vehicle 400 behind the subject vehicle 100, the maximum detection range 160 is reduced to distance MD as part of the processing at block 310.

Factors that affect the distance MD (i.e., the modified maximum detection range 160) include the distance between the subject vehicle 100 and the following vehicle 400, the width W of the following vehicle 400, and the location of the one or more sensors 105 of the subject vehicle 100 that are used to detect objects behind the subject vehicle 100. In the exemplary scenario, the subject vehicle 100 and the following vehicle 400 are assumed to both be centered in the lane for explanatory purposes. Thus, the distance from the center of the subject vehicle 100, where the sensor 105 is assumed to be located, to the corner of interest of the target vehicle 200 is given by (L+W/2). The corner of interest is the left corner of the target vehicle 200 when the target lane 180 is to the left of the subject vehicle 100, and the corner of interest is the right corner of the target vehicle 200 when the target lane is to the right of the subject vehicle 100. The value of L is based on knowledge of the lane width and an assumed width for the target vehicle 200 (e.g., the target vehicle 200 may be assumed to be in the center of the target lane 180).

As FIG. 4 indicates, the value of the distance MD may be determined from equations pertaining to a right triangle based on the angle α and the distance between the sensor 105 and the corner of interest of the target vehicle 200. Thus, the distance MD may be given by (L+W/2)(tan α). As the distance between the subject vehicle 100 and the following vehicle 400 increases, the value of the angle α increases. Thus, with all other things being equal, the distance MD will increase. As the width W of the following vehicle 400 increases, the value of the angle α decreases. Thus, with all other things being equal, the distance MD will decrease. If the sensor 105 is moved to the left rear bumper of the subject vehicle 100 from the center where it is shown, then the angle α increases. Further, (L+W/2) would be reduced by the distance R between the center of the subject vehicle 100 and the left rear bumper. Thus, the distance MD increases as (L+W/2−R)*(tan α). On the other hand, in the exemplary scenario shown in FIG. 4, if the sensor 105 were moved to the right rear bumper of the subject vehicle 100, the following vehicle 400 would block even more of the field of view of the sensor 105, and the distance MD would be much-reduced.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method of performing adaptive control of an automated lane change in a vehicle, the method comprising:
    assuming that a target vehicle with a target speed is in a target lane at a target distance behind the vehicle, wherein the target distance is beyond a maximum detection range of the vehicle in the target lane, the target speed is greater than a speed of the vehicle, and the vehicle will move into the target lane based on the automated lane change;
    determining a deceleration needed by the target vehicle over a distance, which is less than the target distance, to decelerate from the target speed to the speed of the vehicle;
    determining whether the deceleration exceeds a threshold deceleration; and
    prohibiting the automated lane change based on the deceleration exceeding the threshold deceleration.

2. The method according to claim 1, further comprising determining the target distance as a maximum detection range of one or more sensors of the vehicle.

3. The method according to claim 1, further comprising determining the target distance as a distance less than a maximum detection range of one or more sensors of the vehicle based on detecting a following vehicle behind the vehicle.

4. The method according to claim 3, further comprising determining the target distance based on a location of the one or more sensors of the vehicle, a distance between the vehicle and the following vehicle, and a width of the following vehicle.

5. The method according to claim 1, further comprising determining the target speed as a fixed value above a posted speed limit for the target lane.

6. The method according to claim 1, further comprising determining a recognition distance as a distance traveled by the target vehicle in a fixed period of time.

7. The method according to claim 6, further comprising determining the braking distance as the recognition distance and a pre-defined buffer distance subtracted from the target distance.

8. The method according to claim 7, wherein the determining the deceleration needed by the target vehicle is based on the target speed T being an initial speed, the speed of the vehicle S being a final speed, and a distance for the deceleration being the braking distance D.

9. The method according to claim 8, wherein the determining the deceleration needed by the target vehicle includes computing:

$$\frac{S^2 - T^2}{2D}.$$

10. The method according to claim 1, further comprising allowing the automated lane change based on the deceleration being less than or equal to the threshold deceleration.

11. A system to perform adaptive control of an automated lane change in a vehicle, the system comprising:
    one or more sensors configured to detect objects behind the vehicle; and
    a processor configured to assume that a target vehicle with a target speed is in a target lane at a target distance behind the vehicle, wherein the target distance is beyond a maximum detection range of the vehicle in the target lane, the target speed is greater than a speed of the vehicle, and the vehicle will move into the target lane based on the automated lane change, to determine a deceleration needed by the target vehicle over a distance, which is less than the target distance, to decelerate from the target speed to the speed of the vehicle, to determine whether the deceleration exceeds a threshold deceleration, and to prohibit the automated lane change based on the deceleration exceeding the threshold deceleration.

12. The system according to claim 11, wherein the processor is configured to determine the target distance as a maximum detection range of one or more sensors of the vehicle.

13. The system according to claim 11, wherein the processor is configured to determine the target distance as a distance less than a maximum detection range of one or more sensors of the vehicle based on detecting a following vehicle behind the vehicle.

14. The system according to claim 13, wherein the processor is configured to determine the target distance based on a location of the one or more sensors of the vehicle, a distance between the vehicle and the following vehicle, and a width of the following vehicle.

15. The system according to claim 11, wherein the processor is configured to determine the target speed as a fixed value above a posted speed limit for the target lane.

16. The system according to claim 11, wherein the processor is configured to determine a recognition distance as a distance traveled by the target vehicle in a fixed period of time.

17. The system according to claim 16, wherein the processor is configured to determine the braking distance as the recognition distance and a pre-defined buffer distance subtracted from the target distance.

18. The system according to claim 17, wherein the processor is configured to determine the deceleration needed by the target vehicle is based on the target speed T being an initial speed, the speed of the vehicle S being a final speed, and a distance for the deceleration being the distance D.

19. The system according to claim 18, wherein the processor is configured to determine the deceleration needed by the target vehicle based on computing:

$$\frac{S^2 - T^2}{2D}.$$

20. The system according to claim 11, wherein the processor is further configured to allow the automated lane change based on the deceleration being less than or equal to the threshold deceleration.

\* \* \* \* \*